United States Patent [19]
Drahm et al.

[11] Patent Number: 5,736,653
[45] Date of Patent: Apr. 7, 1998

[54] CORIOLIS-TYPE MASS FLOW METER WITH AT LEAST ONE MEASURING TUBE

[75] Inventors: Wolfgang Drahm, Zwingen, Switzerland; Alfred Rieder, Ergolding, Germany

[73] Assignee: Endress + Hauser Flowtec AG, Reinach, Switzerland

[21] Appl. No.: 659,859

[22] Filed: Jun. 7, 1996

[30] Foreign Application Priority Data

Jul. 21, 1995 [EP] European Pat. Off. ............. 95810474

[51] Int. Cl.[6] ............................................. G01F 1/84
[52] U.S. Cl. ........................................... 73/861.356
[58] Field of Search .................. 73/861.355, 861.356, 73/861.357

[56] References Cited

U.S. PATENT DOCUMENTS

| | | |
|---|---|---|
| 4,949,583 | 8/1990 | Lang et al. |
| 5,009,109 | 4/1991 | Kalotay et al. ............. 73/861.38 |
| 5,295,398 | 3/1994 | Lew ........................... 73/861.356 |
| 5,381,697 | 1/1995 | Van Der Pol ............... 73/861.356 |
| 5,425,277 | 6/1995 | Lew ........................... 73/861.356 |
| 5,531,126 | 7/1996 | Drahm. |

FOREIGN PATENT DOCUMENTS

| | | |
|---|---|---|
| 0 300 301 | 1/1989 | European Pat. Off. |
| 0 375 300 | 6/1990 | European Pat. Off. |
| 88/03261 | 5/1988 | WIPO. |
| 89/01134 | 2/1989 | WIPO. |
| 98/03336 | 2/1993 | WIPO. |
| 95/03528 | 2/1995 | WIPO. |

Primary Examiner—Richard Chilcot
Assistant Examiner—Jewel V. Artis
Attorney, Agent, or Firm—Bose McKinney & Evans

[57] ABSTRACT

A Coriolis-type mass flow meter is disclosed which can be installed, e.g., via flanges, in a conduit of a given diameter so as to be axially aligned with said conduit, which is traversed by a fluid to be measured. To further improve and optimize its insensitivity to vibrations originating from the conduit, this Coriolis-type mass flow meter comprises: at least one measuring tube fixed to the flanges; a support tube having its ends fixed to the respective flanges; means for exciting the measuring tube into resonance vibrations; velocity sensors positioned along the measuring tube for sensing the vibrations of the measuring tube; acceleration sensors positioned on the support tube along a line of intersection with that plane in which Coriolis forces act; and means which process signals from the velocity sensors and signals from the acceleration sensors into a mass flow signal which is substantially free from interference.

5 Claims, 2 Drawing Sheets

CORIOLIS-TYPE MASS FLOW METER WITH AT LEAST ONE MEASURING TUBE

FIELD OF THE INVENTION

The present invention relates to a Coriolis-type mass flow meter with at least one measuring tube for a fluid to be measured.

BACKGROUND OF THE INVENTION

Applicant's WO-A 95/03528 (corresponding to U.S. patent application Ser. No. 08/277,245) describes a mass flow sensor which can be installed, by means of flanges, in a conduit of a given diameter so as to be axially aligned with said conduit, through which flows a fluid to be measured, with a straight measuring tube extending between the flanges and traversed by the fluid, with a straight dummy tube extending parallel to the measuring tube and not traversed by the fluid, with a nodal plate on the inlet side and a nodal plate on the outlet side, one of which fixes the inlet-side end portion of the measuring tube to the corresponding end portion of the dummy tube, and the other of which fixes the outlet-side end portion of the measuring tube to the corresponding end portion of the dummy tube so that the measuring tube and the dummy tube are arranged side by side, with a support tube having its ends fixed in the respective flanges, with means which act only on the dummy tube to excite resonance vibrations of the measuring tube, and with an acceleration sensor mounted on the support tube to provide a signal by which vibrations of the support tube are minimized.

Applicant's U.S. Pat. No. 4,949,583 discloses a mass flow sensor with a single straight measuring tube which is excited into peristaltic vibrations of its cross-sectional area.

In practice it has turned out that mass flow meters with the first-mentioned mass flow sensor are not yet optimal as regards their insensitivity to vibrations. These vibrations stem, for example, from the conduit in which the mass flow sensors are installed, and originate, for example, from vibrating pumps which cause the mass flow in the conduit.

SUMMARY OF THE INVENTION

To further improve and optimize this insensitivity to vibrations stemming from the conduit, the invention therefore provides a Coriolis-type mass flow meter which can be installed, e.g., by means of flanges, in a conduit of a given diameter so as to be axially aligned with said conduit, through which flows a fluid to be measured, with at least one measuring tube extending between and fixed to the flanges and traversed by the fluid, with a support tube having its ends fixed to the respective flanges, with means for exciting the measuring tube or measuring tubes into resonance vibrations, with a first velocity sensor and a second velocity sensor positioned along the measuring tube or measuring tubes for measuring the vibrations of the measuring tube or measuring tubes, with a first acceleration sensor and a second acceleration sensor positioned on the support tube along a line of intersection with that plane in which Coriolis forces act during operation of the mass flow meter, and with means for processing signals from the velocity sensors and signals from the acceleration sensors into a mass flow signal which is substantially free from interference.

In a preferred embodiment of the invention, a single straight measuring tube is provided. In another preferred embodiment of the invention, a single bent measuring tube is provided which extends in one plane.

In a further preferred embodiment of the invention, the means for processing the signals from the velocity sensors and the signals from the acceleration sensors into a mass flow signal comprise the following subcircuits:

a first subtracter having a subtrahend input connected to the first acceleration sensor and a minuend input connected to the second acceleration sensor;

a second subtracter having a subtrahend input connected to the first velocity sensor and a minuend input connected to the second velocity sensor;

a first summer having a first input connected to the first velocity sensor and a second input connected to the second velocity sensor;

a first multiplier having a first input connected to the output of the first subtracter and a second input to which a first calibration factor determined by calibration in the presence of vibrations acting on the mass flow meter via the conduit is applied;

a second multiplier having a first input connected to the output of the first summer and a second input to which a second calibration factor determined by calibration in the absence of vibrations acting on the mass flow sensor via the conduit is applied;

an integrator having its input connected to the output of the second subtracter;

a second summer having a first input connected to the output of the first multiplier and a second input connected to the output of the integrator;

a first inverter connected to the output of the second summer;

a first double-throw switch having a first input connected to the output of the second summer and a second input connected to the output of the first inverter;

a second inverter connected to the output of the second multiplier;

a second double-throw switch having a first input connected to the output of the second multiplier and a second input connected to the output of the second inverter;

a threshold switch having a signal input connected to the output of the second multiplier, a threshold input connected to ground, and an output connected to the control inputs of the first double-throw switch and the second double-throw switch;

a first low-pass filter connected to the output of the first double-throw switch;

a second low-pass filter connected to the output of the second double-throw switch, said low-pass filters having an upper cutoff frequency which is approximately one order of magnitude lower than the highest frequency occurring in their input signals; and a divider having a dividend input connected to the output of the first low-pass filter, a divisor input connected to the output of the second low-pass filter, and an output providing the mass flow signal.

In the latter embodiment, the first subtracter and the acceleration sensors may be replaced by a single acceleration sensor which responds to rotation vibrations.

BRIEF DESCRIPTION OF THE DRAWINGS

The invention will now be explained in more detail with reference to the accompanying drawings, in which a mechanical portion of a mass flow meter and a subcircuit for generating a mass flow signal are shown as preferred embodiments.

DETAILED DESCRIPTION OF THE DRAWINGS

Figure 1:
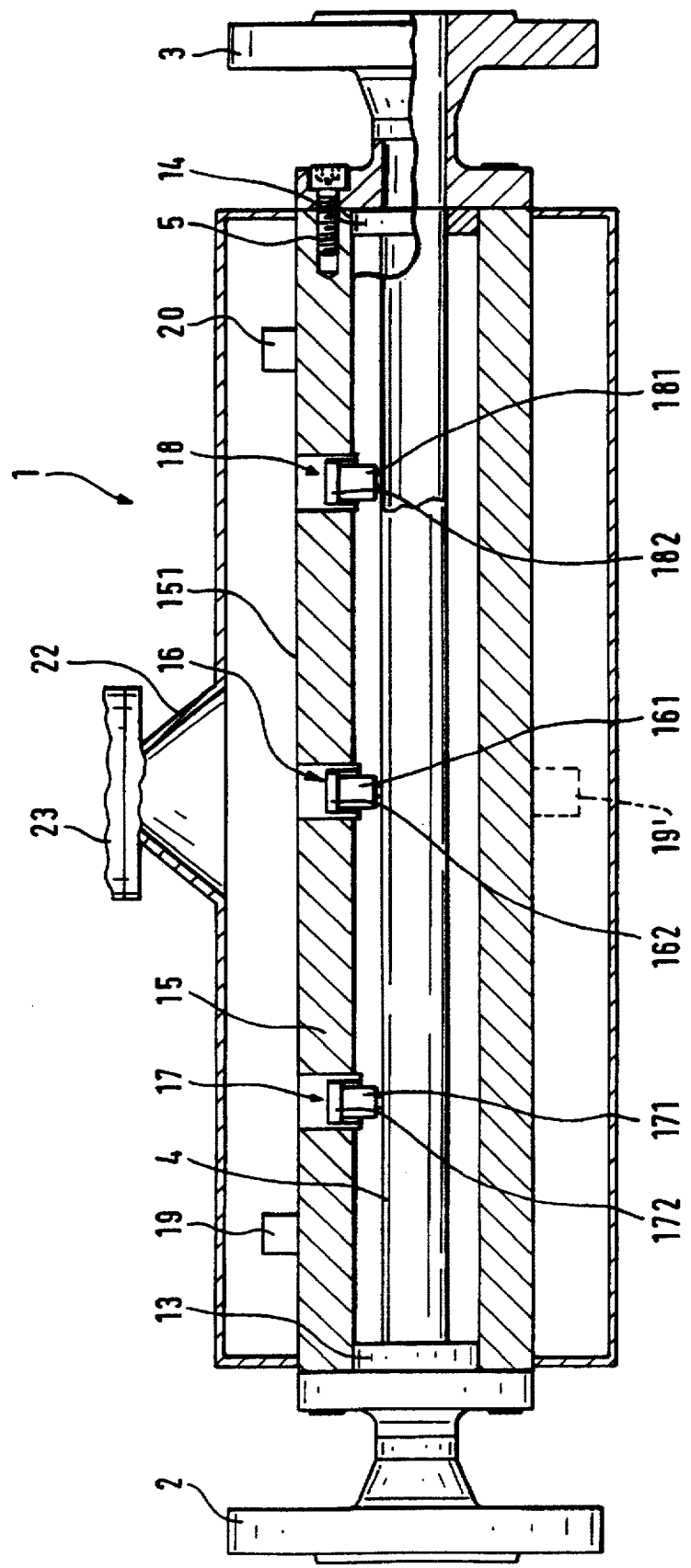
FIG. 1 is a vertical, partially sectioned longitudinal view of the mechanical portion of a mass flow meter with a single straight measuring tube.

The mechanical portion of a mass flow meter shown in FIG. 1 in a vertical, partially sectioned longitudinal view, i.e., the mass flow sensor 1 of the mass flow meter, can be installed in a conduit (not shown for the sake of clarity) of a given diameter via flanges 2, 3, the conduit carrying a fluid to be measured.

The mass flow sensor 1 of the embodiment has a single straight measuring tube, which is fixed at the ends to the respective flanges 2, 3, e.g., via end plates 13, 14, in which the respective ends of the measuring tube 4 are fixed, preferably vacuum-tight, e.g., welded, soldered, or press-bonded using a roller, the press-bonding being described in applicant's prior, still unpublished EP Application 95 81 0199.0 (corresponding to U.S. patent application Ser. No. 08/434,070, filed May 3, 1995).

According to a further aspect of the invention, instead of a single straight measuring tube, a single bent measuring tube extending in one plane, e.g., a circular-sector-shaped measuring tube, can be used. It is also measuring tube, can be used. It is also possible to use two or more, preferably two, measuring tubes, or a mass flow sensor with one measuring tube and one dummy tube as disclosed in the above-mentioned WO-A 95/03528 corresponding to U.S. patent application Ser. No. 08/277,245).

The flanges 2, 3 and the end plates, 13, 14 are fixed to or in a support tube 15. In FIG. 1, the flanges 2, 3 are attached to the support tube 15 by means of screws, one of which, a screw 5, is completely visible in the cross-sectional view on the upper right. The end plates 13, 14 may be welded or soldered to the inner wall of the support tube 15 to form a tight, particularly vacuum-tight, joint. It is also possible to form the support tube 15 and the end plates 13, 14 as a single piece.

As means for exciting the measuring tube 4 into resonance vibrations, preferably into flexural resonance vibrations, a driver assembly 16, e.g., an electrodynamic driver assembly, is positioned midway between the flanges 2, 3 and the end plates 13, 14 in the space between the support tube 15 and the measuring tube 4. It comprises a permanent magnet 161 mounted on the measuring tube 4 and a coil 162 mounted on the support tube 15, the permanent magnet 161 extending into this coil and being movable to and fro therein. The means for exciting the measuring tube into resonance vibrations further include a driver circuit of a type described in the prior art, cf., for example, applicant's U.S. Pat. No. 4,801,897.

Also provided in the space between the support tube 15 and the measuring tube 4 are a first velocity sensor 17 and a second velocity sensor 18 for the vibrations of the measuring tube 4, which are positioned along the latter and preferably spaced the same distance from the driver assembly 16, i.e., from the middle of the measuring tube 4.

If the distances of the velocity sensors 17, 18 from the middle of the measuring tube 4 or their sensitivities differ, the resulting unbalance must be offset via the gain of a subsequent amplifier.

The velocity sensors 17, 18 are, for example, optical velocity sensors of the type described in the above-mentioned U.S. Pat. No. 4,801,897. Preferably, however, the velocity sensors 17, 18 are electrodynamic velocity sensors which each comprise a permanent magnet 171, 181 mounted on the measuring tube 4 and a coil 172, 182 attached to the support tube 15. The permanent magnet 171, 181 extends into the coil 172, 182 and is movable to and fro therein. The velocity sensors 17 and 18 provide signals $x_{17}$ and $x_{18}$, respectively.

A first acceleration sensor 19 and a second acceleration sensor 20 are fixed to the support tube 15 in a spaced relationship along a line of intersection with that plane in which Coriolis forces act during operation of the mass flow meter. The acceleration sensors 19 and 20 provide signals $x_{19}$ and $x_{20}$, respectively.

In FIG. 1, the aforementioned plane is the plane of the paper, since the driver assembly 16 excites the measuring tube 4 into flexural vibrations in the plane of the paper, so that Coriolis forces act in this plane. Accordingly, the aforementioned line of intersection is the boundary line of the support tube 15, designated 151 in FIG. 1. Preferably, the two acceleration sensors 19, 20 are spaced the same distance from the middle of the support tube 15; this distance need not be identical with the above-mentioned distance between the velocity sensors 17, 18.

To achieve as high a signal-to-noise ratio as possible, the distance must be as great as possible. If the distances differ, the remarks made above about the velocity sensors apply analogously.

It may be appropriate to free the signals $x_{17} \ldots x_{20}$ from any interference as close to the sensors as possible by filtering them with narrow-band filters, the center frequency of this filtering being the vibration frequency of the measuring tube 4. The respective center frequencies of the band-pass filters provided for this purpose must therefore be adjustable.

FIG. 1 also shows a housing 21 which is fixed to the support tube 15 and serves, inter alia, to protect lines which are connected to the driver assembly 16, the velocity sensors 17, 18, and the acceleration sensors 19, 20, but which are not shown for the sake of clarity.

The housing 21 has a necklike transition portion 22 to which an electronics housing 23 (shown only in part) for receiving the entire drive and evaluation electronics of the mass flow meter is fixed.

If the transition portion 22 and the electronics housing 23 should adversely affect the vibration response of the support tube 15, they may also be located separate from the mass flow sensor 1. In that case, only a line connection will be provided between the electronics and the mass flow sensor 1.

Figure 2:
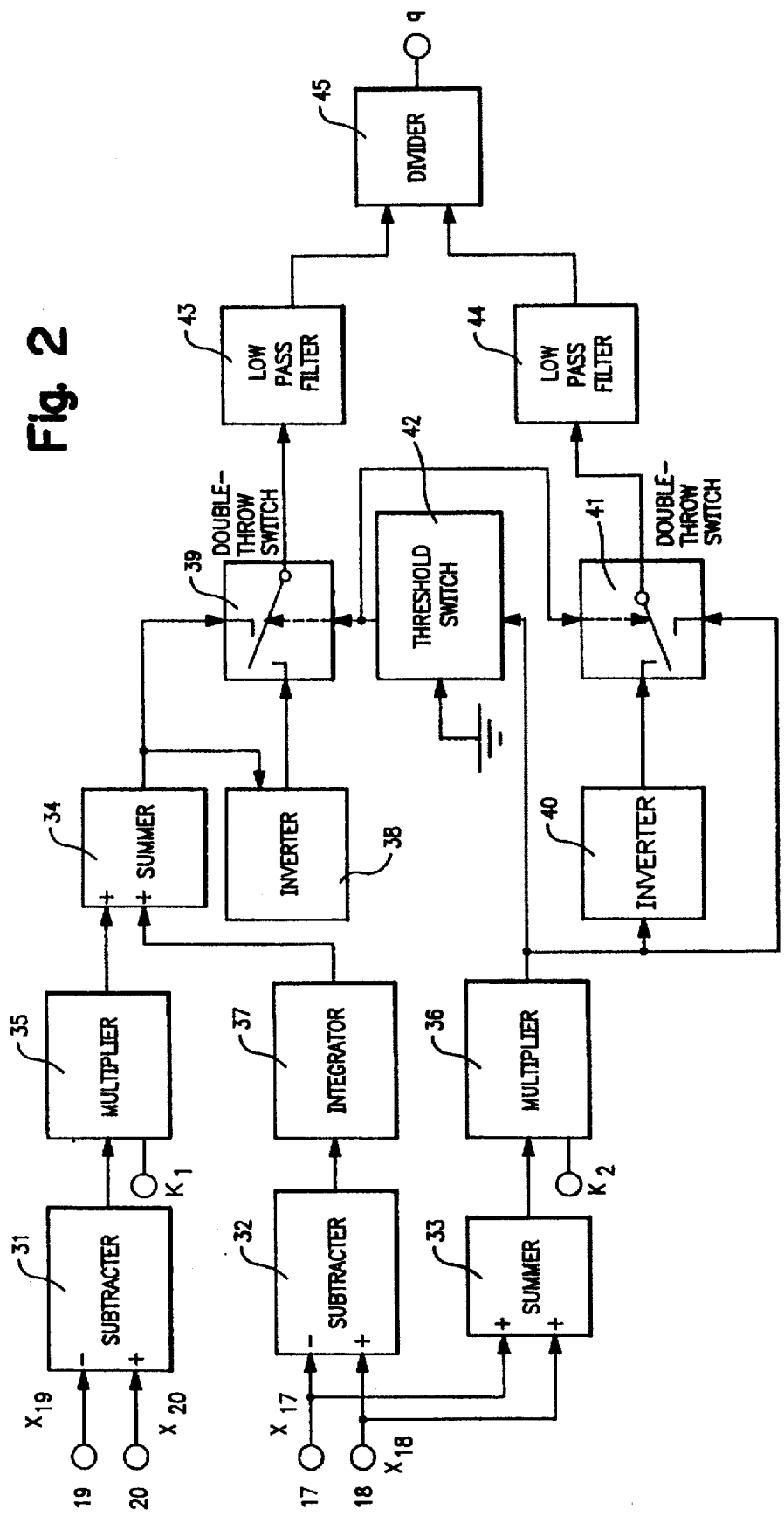
FIG. 2 shows a subcircuit for generating a mass flow signal.

FIG. 2 shows means which process the signals $x_{17}$, $x_{18}$ from the velocity sensors 17, 18 and the signals $x_{19}$, $x_{20}$ from the acceleration sensors 19, 20 into a mass flow signal which is substantially free from interference. These means comprise the subcircuits contained in FIG. 2.

The first acceleration sensor 19 is connected to a subtrahend input "−" of a first subtracter 31, and the second acceleration sensor 20 to a minuend input "+" of this subtracter 31. The first velocity sensor 17 is connected to a subtrahend input "−" of a second subtracter 32, and the second velocity sensor 18 to a minuend input "+" of this subtracter 32. The first velocity sensor 17 is also connected to a first input "+" of a first summer 33, and the second velocity sensor 18 to a second input "+" of this summer.

The output of the first subtracter 31 is coupled to a first input of a first multiplier 35 whose second input is fed with a first calibration factor $K_1$ determined by calibration in the presence of vibrations acting on the mass flow meter via the conduit. The output of the first summer 33 is coupled to a first input of a second multiplier 36 whose second input is fed with a second calibration factor $K_2$ determined in the absence of vibrations acting on the mass flow meter via the conduit.

The two calibration factors $K_1$, $K_2$ are determined after completion of the mass flow meter in the conventional manner by calibration, i.e., by comparing a known mass flow with flow values measured by the mass flow meter for this known mass flow, and subsequently stored in a memory device contained in the mass flow meter, e.g., an EEPROM (=electrically erasable and programmable read-only memory) or a similar semiconductor memory.

An input of an integrator 37 is connected to the output of the second subtracter 32. The output of the first multiplier 35 is coupled to a first input "+" of a second summer 34 which has its second input "+" connected to the output of the integrator 37.

The output of the second summer 34 is coupled to the input of a first inverter 38 which may be implemented, for example, with a stage multiplying by −1 if analog signals are provided at the output of the summer 34, or with a digital inverter if digital signals are provided at the output of the summer 34.

The outputs of the second summer 34 and the first inverter 38 are connected, respectively, to first and second inputs of a first double-throw switch 39.

The output of the second multiplier 36 is coupled to the input of a second inverter 40 which, like the first inverter 38, may be implemented with a stage multiplying by −1 if analog signals are provided at the output of the second multiplier 36, or with a digital inverter if digital signals are provided at the output of the second multiplier 36.

The output of the second multiplier 36 is coupled to a signal input of a threshold switch 42, and a threshold input of the latter is grounded. The output of the threshold switch 42 controls the double-throw switches 39 and 41.

The first inverter 38, the first double-throw switch 39, and the threshold switch 40 have the function of a first synchronous detector, and the second inverter 40, the second double-throw switch 39, and the threshold switch 40 have the function of a second synchronous detector. Instead of the second synchronous detector, a peak detector may be provided, whose input must be connected to the output of the second multiplier 36 and which can be either a half-wave rectifier or a full-wave rectifier.

The outputs of the double-throw switches 39 and 41 are followed by first and second low-pass filters 43 and 44, respectively. The two low-pass filters each have an upper cutoff frequency which is approximately one order of magnitude lower than the highest frequency occurring in the filter input signals, i.e., in the output signals of the double-throw switches 39 and 41, respectively.

The output of the first low-pass filter 43 is coupled to a dividend input of a divider 45 whose divisor input is connected to the output of the second low-pass filter 44. The output of the divider 45 provides a mass flow signal q.

Figure 3:
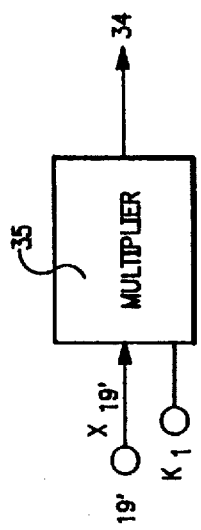
FIG. 3 shows a modification of portion of the subcircuit of FIG. 2.

FIG. 3 shows a modification of a portion of the circuit of FIG. 2. Instead of the first subtracter 31 of FIG. 2 and the two acceleration sensors 19, 20 of FIG. 1, only a single acceleration sensor 19' is provided for measuring rotation vibrations, which is preferably mounted in the middle of the support tube 15 and is indicated in FIG. 1 by a broken line. It is connected to the first input of the first multiplier 35.

The circuits of FIGS. 2 and 3 require that the subcircuits contained therein are circuits which process the analog signals from the acceleration sensors and the velocity sensors in analog form. It is, however, within the scope of the invention to use corresponding digital circuits instead of such analog circuits, as was explained above with regard to the inverter 38.

Then, however, either the acceleration sensors and the velocity sensors must be replaced by corresponding sensors which provide digital signals, or the acceleration sensors and the velocity sensors must be succeeded by analog-to-digital converters.

The circuits of FIGS. 2 and 3 and their operation are predicated on the recognitions of the inventors explained in the following. For the operating condition of the mass flow meter 1, three different vibration modes can be defined, which can be assigned one (mathematically) complex vibration amplitude each (complex in the mathematical sense).

These complex vibration amplitudes are each denoted by a capital letter, e.g., generally by Y. The respective associated amplitude of the really measured signal is denoted by the corresponding small letter, i.e., by y, for example. Thus, the following general relationships are true:

$$y = Re\{Y \cdot exp(j\Omega t)\} = |Y| \cdot cos[\Omega t + arc(Y)] \quad (1)$$

$$Y = |Y| \cdot exp[j \cdot arc(Y)] \quad (2)$$

In Equations (1) and (2):

$j = \sqrt{-1}$ $\Omega = 2\pi f$, where f is the vibration frequency of the measuring tube 4 t = the time variable

Re = an operator which provides the real part of the complex amplitude

| | = an operator which provides the absolute value of the complex amplitude arc = an operator which provides the phase of the complex amplitude.

Reverting to the above-mentioned vibration modes of the mass flow meter, the measuring tube 4 has a drive mode with the (complex) deflection amplitude $A_A$ and a Coriolis mode with the (complex) deflection amplitude $A_C$, while the support tube has a rotation mode with the (complex) deflection amplitude $A_R$.

For the deflection amplitude $A_c$ of the Coriolis mode, the following excitation equation can be set up:

$$\begin{aligned} A_C &= K_C [j\Omega Q K_{CA} A_A - (j\Omega)^2 K_{CR} A_R] \quad (3) \\ &= Q K_C K_{CA} V_A - K_C K_{CR} B_R \\ &= V_C / (j\Omega) \end{aligned}$$

From this, the (complex) mass flow Q is $$Q = [V_C/(j\Omega) + K_R B_R]/(K_A V_A) \quad (4)$$
$$= (A_C + K_R B_R)/(K_A V_A)$$
$$= A_C'/(K_A V_A)$$

In Equations (3) and (4) and in the following equations:

$K_A$=(real) transmission coefficient of the excited vibration of the measuring tube, which must be determined by the forementioned calibration and is thus equal to the above calibration factor $K_2$ $K_C$=(real) transmission coefficient of the Coriolis mode of the measuring tube 4

$K_R$=(real) transmission coefficient of the interference-induced rotational vibrations of the support tube 15, which must be determined by the aforementioned calibration and is thus equal to the above calibration factor $K_1$ $K_{CA}$=(real) coefficient of coupling between the drive mode and the Coriolis mode of the measuring tube 4

$K_{CR}$=(real) coefficient of coupling between the rotation mode of the support tube 15 and the Coriolis mode of the measuring tube 4

$V_A$=(complex) amplitude of the velocity of the measuring tube 4 in the drive mode $V_C$=(complex) amplitude of the velocity of the measuring tube 4 in the Coriolis mode $B_R$=(complex) amplitude of the angular acceleration of the support tube 15 in the rotation mode $A_C$=corrected (complex) deflection amplitude of the measuring tube 4 in the Coriolis mode.

The complex quantities $V_A$, $V_C$, $B_R$ can be derived from the (complex) amplitudes $X_{17}$, $X_{18}$ of the signals $x_{17}$, $x_{18}$ of the velocity sensors 17, 18 and from the (complex) amplitudes $X_{19}$, $X_{20}$ of the signals $x_{19}$, $x_{20}$ of the acceleration sensors 19, 20 by the following equations:

$$V_A = X_{18} + X_{17} \quad (5)$$

$$V_C = X_{18} - X_{17} \quad (6)$$

$$B_R = X_{20} - X_{19} \quad (7)$$

The real part Re (Q) of the (complex) mass flow Q gives the (real) mass flow q:

$$q = Re\{Q\} = |A_C'|/(K_A|V_A|) \quad (8)$$

A generalized systematic relationship follows from the following equation for the excitation of the vibrations of a mass flow sensor which is not ideally symmetrical:

$$A_C = K_C[QL_{cs}V_A - M_{rs}B_R - M_{rd}B_A - D_{rd}V_A - S_{rd}A_A - M_{rd}B_T + QL_{cd}V_C] \quad (9)$$

Solving for Q, $$Q = A_C'/(K_C L_{CS} V_A) + M_{rs} B_R/(L_{cs} V_A) + M_{rd} B_A/(L_{cs} V_A) + \quad (10)$$
$$D_{rd}/L_{cs} + S_{rd} A_A/(L_{cs} V_A) + M_{rd} B_T/(L_{cs} V_A) -$$
$$QL_{cd} V_C/(L_{cs} V_A)$$

In Equations (9) and (10), $B_T$=(complex) amplitude of the acceleration of the support tube 15 in the translation mode
M=mass of the measuring tube 4
D=damping of the vibration system
S=stiffness of the measuring tube
L=damping of the Coriolis mode.
Furthermore,
c as first subscript=relating to the Coriolis mode
r as first subscript=relating to the measuring tube 4
s as second subscript=symmetrical component
d as second subscript=unsymmetrical component.

The synchronous demodulator suppresses signal components which are not in phase with $V_A$, namely the third, fifth, and seventh terms in Equation (10). Hence, $$q = Re\{Q\} = A_C'/(K_C L_{cs} V_A) + M_{rs} B_R/(L_{cs} V_A) + D_{rd}/L_{cs} + M_{rd} B_T/(L_{cs} V_A))$$

where:
first term=measurand
second term=unwanted component due to symmetrical mass fractions of the measuring tube 4 and the rotation mode
third term=unwanted component due to the asymmetrical damping component of the measuring tube 4
fourth term=unwanted component due to the asymmetrical mass fractions of the measuring tube 4 and the translation mode.

From the relationships explained with the aid of Equations (1) to (11) it is clear that it is within the scope of the invention to replace the velocity sensors 17, 18 by position or acceleration sensors, with velocity signals having to be produced from the respective sensor output signals by means of subcircuits which differentiate once over time in the case of position sensors or integrate once over time in the case of acceleration sensors.

Furthermore, it is within the scope of the invention to replace the acceleration sensors 19, 20 by position or velocity sensors, with acceleration signals having to be produced from the respective sensor output signals by means of subcircuits which differentiate twice of time in the case of position sensors or which differentiate once over time in the case of velocity sensors.

It is also within the scope of the invention to implement the functions of the individual subcircuits of FIGS. 2 and 3 with a suitably programmed microprocessor.

We claim:

1. A Coriolis-type mass flow meter
   which can be installed by means of flanges, in a conduit of a given diameter so as to be axially aligned with said conduit, through which flows a fluid to be measured,
   with at least one measuring tube extending between and fixed to the flanges and traversed by the fluid,
   with a support tube having its ends fixed to the respective flanges,
   with means for exciting the measuring tube or measuring tubes into resonance vibrations,
   with a first velocity sensor and a second velocity sensor positioned along the measuring tube or measuring tubes for measuring the vibrations of the measuring tube or measuring tubes,
   with a first acceleration sensor and a second acceleration sensor positioned on the support tube along a line of intersection with that plane in which Coriolis forces act during operation of the mass flow meter, and
   with means for processing signals from the velocity sensors and signals from the acceleration sensors into a mass flow signal which is substantially free from interference.

2. A mass flow meter as claimed in claim 1, comprising a single straight measuring tube.

3. A mass flow meter as claimed in claim 1, comprising a single bent measuring tube extending in one plane.

4. A mass flow meter as claimed in claim 1 wherein the means for processing the signals from the velocity sensors and the signals from the acceleration sensors into a mass flow signal comprise the following subcircuits:
   a first subtracter having a subtrahend input connected to the first acceleration sensor and a minuend input connected to the second acceleration sensor;

a second subtracter having a subtrahend input connected to the first velocity sensor and a minuend input connected to the second velocity sensor;

a first summer having a first input connected to the first velocity sensor and a second input connected to the second velocity sensor;

a first multiplier having a first input connected to the output of the first subtracter and a second input to which a first calibration factor determined by calibration in the presence of vibrations acting on the mass flow meter via the conduit is applied;

a second multiplier having a first input connected to the output of the first summer and a second input to which a second calibration factor determined by calibration in the absence of vibrations acting on the mass flow sensor via the conduit is applied;

an integrator having its input connected to the output of the second subtracter;

a second summer having a first input connected to the output of the first multiplier and a second input connected to the output of the integrator;

a first inverter connected to the output of the second summer;

a first double-throw switch having a first input connected to the output of the second summer and a second input connected to the output of the first inverter;

a second inverter connected to the output of the second multiplier;

a second double-throw switch having a first input connected to the output of the second multiplier and a second input connected to the output of the second inverter;

a threshold switch having a signal input connected to the output of the second multiplier, a threshold input connected to ground, and an output connected to the control inputs of the first double-throw switch and the second double-throw switch;

a first low-pass filter connected to the output of the first double-throw switch;

a second low-pass filter connected to the output of the second double-throw switch, said low-pass filters having an upper cutoff frequency which is approximately one order of magnitude lower than the highest frequency occurring in their input signals; and a divider having a dividend input connected to the output of the first low-pass filter, a divisor input connected to the output of the second low-pass filter, and an output providing the mass flow signal.

5. A mass flow meter as claimed in claim 4 wherein the first subtracter and the acceleration sensors are replaced by a single acceleration sensor which measures rotation vibrations.

* * * * *